United States Patent
Liu et al.

(10) Patent No.: US 9,244,552 B2
(45) Date of Patent: Jan. 26, 2016

(54) TOUCH DISPLAY AND DRIVING METHOD THEREOF

(71) Applicant: AU Optronics Corp., Hsin-Chu (TW)

(72) Inventors: Gui-Wen Liu, Hsin-Chu (TW);
Chao-Chen Wang, Hsin-Chu (TW);
Chao-Chuan Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 257 days.

(21) Appl. No.: 14/034,512

(22) Filed: Sep. 23, 2013

(65) Prior Publication Data

US 2014/0340349 A1    Nov. 20, 2014

(30) Foreign Application Priority Data

May 14, 2013    (TW) .............................. 102117053 A

(51) Int. Cl.
*G06F 3/041*    (2006.01)
(52) U.S. Cl.
CPC .............. *G06F 3/041* (2013.01); *G06F 3/0412* (2013.01)
(58) Field of Classification Search
CPC ........ G06F 3/044; G06F 3/045; G06F 3/0412
USPC ..................... 345/173–179; 178/18.01–18.04
See application file for complete search history.

(56) References Cited

U.S. PATENT DOCUMENTS

| | | | | |
|---|---|---|---|---|
| 8,681,089 B2* | 3/2014 | Huang | ................ | G02F 1/13338 345/104 |
| 8,994,712 B2* | 3/2015 | Park | ...................... | G06F 3/0412 345/173 |
| 2007/0268243 A1* | 11/2007 | Choo | ................... | G02F 1/13338 345/104 |
| 2010/0013789 A1* | 1/2010 | Chung | .................... | G06F 3/044 345/174 |
| 2011/0084918 A1 | 4/2011 | Sung | | |
| 2011/0316809 A1* | 12/2011 | Kim | ...................... | G06F 3/0412 345/174 |
| 2012/0038585 A1* | 2/2012 | Kim | ...................... | G06F 3/0412 345/174 |
| 2012/0169660 A1 | 7/2012 | Seo | | |
| 2013/0335338 A1* | 12/2013 | Lai | ........................... | G06F 3/044 345/173 |

FOREIGN PATENT DOCUMENTS

| | | |
|---|---|---|
| TW | M387275 U1 | 8/2010 |
| TW | 201227482 A1 | 7/2012 |

* cited by examiner

*Primary Examiner* — Kimnhung Nguyen
(74) *Attorney, Agent, or Firm* — Winston Hsu; Scott Margo

(57) ABSTRACT

A touch display includes a plurality of pixels, a plurality of scan lines, a plurality of data lines, a plurality of first conducting layers, and a plurality of third conducting layers. The plurality of scan lines are coupled to the plurality of pixels. The plurality of data lines are coupled to the plurality of pixels and the plurality of first conducting layers to provide a touch driving signal. Each first conducting layer of the plurality of first conducting layers is configured to receive the touch driving signal. The plurality of third conducting layers is configured to output a touch sensing signal according to the touch driving signals outputted by the plurality of first conducting layers.

12 Claims, 17 Drawing Sheets

TOUCH DISPLAY AND DRIVING METHOD THEREOF

BACKGROUND OF THE INVENTION

1. Field of the Invention

The present invention relates to a touch display, and more particularly, a touch display and a driving method of the touch display.

2. Description of the Prior Art

As technology advances, touch sensors are able to be embedded into a liquid crystal display to form an "in-cell" touch display. Because an in-cell touch display does not need an additional touch panel, it can reduce the thickness of the touch display and enhance the experience of touch control. Hence the in-cell touch display has gradually gaining its popularity in the development of display technology.

FIG. 1A shows a transmitting terminal conducting layer 102 and a receiving terminal conducting layer 104 in an in-cell touch display 100 of prior art. When a user touches the touch display 100, the capacitance C4 between the two conducting layers 102, 104 will change, thus the receiving terminal conducting layer 104 will generate a touch sensing signal TS having a magnitude different from a magnitude before the touch display 100 is being touched, and the receiving terminal conducting layer 104 will transmit the touch sensing signal TS to the touch sensing integrated circuit 106 so as to determine the position over which the touch display 100 is being touched by the user. FIG. 1B is a timing diagram of the signals of the touch display 100. After receiving a touch driving signal DS, the transmitting terminal conducting layer 102 generates an electromagnetic signal Tx, and the receiving terminal conducting layer 104 generates a touch sensing signal TS according to the capacitance between the two conducting layers 102, 104. In FIG. 1B, the broken line S0 refers to a touch sensing signal when the touch display 100 is not being touched, and the solid line S1 refers to a touch sensing signal when the touch display 100 is being touched. The difference between the broken line S0 and the solid line S1 is very small, thus the touch sensing signals before and after the touch display 100 is being touched are very similar. That is, the capacitances between the two conducting layers 102 and 104 before and after the touch display 100 is being touched are very similar. Therefore the touch display 100 is not very sensitive to triggers of the user, making improvement of the sensitivity of the touch display 100 an important issue.

SUMMARY OF THE INVENTION

An embodiment of the present invention discloses a touch display. The touch display comprises a substrate, a plurality of pixels formed at one side of the substrate, and a plurality of third conducting layers formed at a side of the pixels opposite to the substrate. Each of the pixels comprises a transistor, a pixel electrode, a first conducting layer and a second conducting layer. The transistor comprises a semiconductor layer, a first electrode formed at a first side of the semiconductor layer, a second electrode and a gate electrode. The second electrode of the transistor is formed at a second side of the semiconductor layer, and the second side of the semiconductor layer is opposite to the first side of the semiconductor layer. The gate electrode of the transistor is formed at a third side of the semiconductor layer and configured to control the transistor to turn on and turn off. The pixel electrode of the pixel is electrically coupled to the second electrode. The first conducting layer is formed at a side of the transistor opposite to the substrate, electrically coupled to the first electrode through a via, and configured to receive a touch driving signal. The second conducting layer is formed at a side of the first conducting layer, insulated from the first conducting layer, and configured to generate an electrical field with the pixel electrode so as to drive a liquid crystal layer. Each of the third conducting layers is configured to output a touch sensing signal in response to a plurality of touch driving signals received by a plurality of first conducting layers of the pixels.

Another embodiment of the present invention discloses a touch display. The touch display comprises a plurality of pixels, a plurality of scan lines electrically coupled to the pixels, a plurality of first conducting layers, a plurality of data lines and a plurality of third conducting layers. Each of the plurality of first conducting layers is configured to receive a touch driving signal. The plurality of data lines are electrically coupled to the pixels and to the first conducting layers and configured to provide image data of the pixels and provide a plurality of touch driving signals to the first conducting layers. The plurality of third conducting layers are formed at one side of the first conducting layers, and each of the third conducting layers is configured to output a touch sensing signal in response to the touch driving signals received by the first conducting layers.

Yet another embodiment of the present invention discloses a method. The method comprises providing image data to a plurality of data lines in a horizontal refresh period, providing a plurality of touch driving signals to the data lines and outputting a plurality of touch sensing signals in response to the touch driving signals.

These and other objectives of the present invention will no doubt become obvious to those of ordinary skill in the art after reading the following detailed description of the preferred embodiment that is illustrated in the various figures and drawings.

DETAILED DESCRIPTION

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims.

In the whole patent application and the claims, except for clearly described content, the meaning of the article "a" and "the" include the meaning of "one or at least one" of the element or component. Moreover, in the whole patent application and the claims, except that the plurality can be excluded obviously according to the context, the singular articles also contain the description for the plurality of elements or components.

Furthermore, the terms adopted in the whole patent application and the claims, except for being specially noted, usually have the common meaning of the term in the art. The terms here such as "substantially", "around", "about", or "approximately" are used to mean that the inaccuracy of the given value or range is less than 20%, or less than 10% in better case. Besides, the value given below can be an approximation, hence it means that if there is no particular statement, the terms "around", "about", or "approximately" can be adopted. In addition, if "electrically couple" or "electrically connect" is used, it means a directly or an indirectly way to make connection electrically. Similarly, the term "couple" or "connect" means a directly or an indirectly way to connect or couple.

Besides, in the whole patent application and all claims, the term "in response to" comprises (1) in direct response to, or (2) in indirect response to. For instance, if an event B happens in response to an event A, that includes: (1) the event B is generated directly in response to the event A; (2) an event A' happens in response to the event A, and the event B happens because of the event A'. Similarly, if a statement such as "according to a parameter A, a result B is effected" is declared, when there is no particularly explanation, the parameter A can be the only parameter or one of many parameters which affect(s) the result B. What is more, in the whole patent application and the claims, if the term "built/used to act for a function" is used to describe an element, this does not mean that the described element is only with the described function, in other words, the described function is possible to be just one of a plurality of functions of the element.

The following is a detailed description of the present invention with some embodiments and figures, but the provided embodiments are not used to limit the scope covered by the present invention.

Figure 1A:
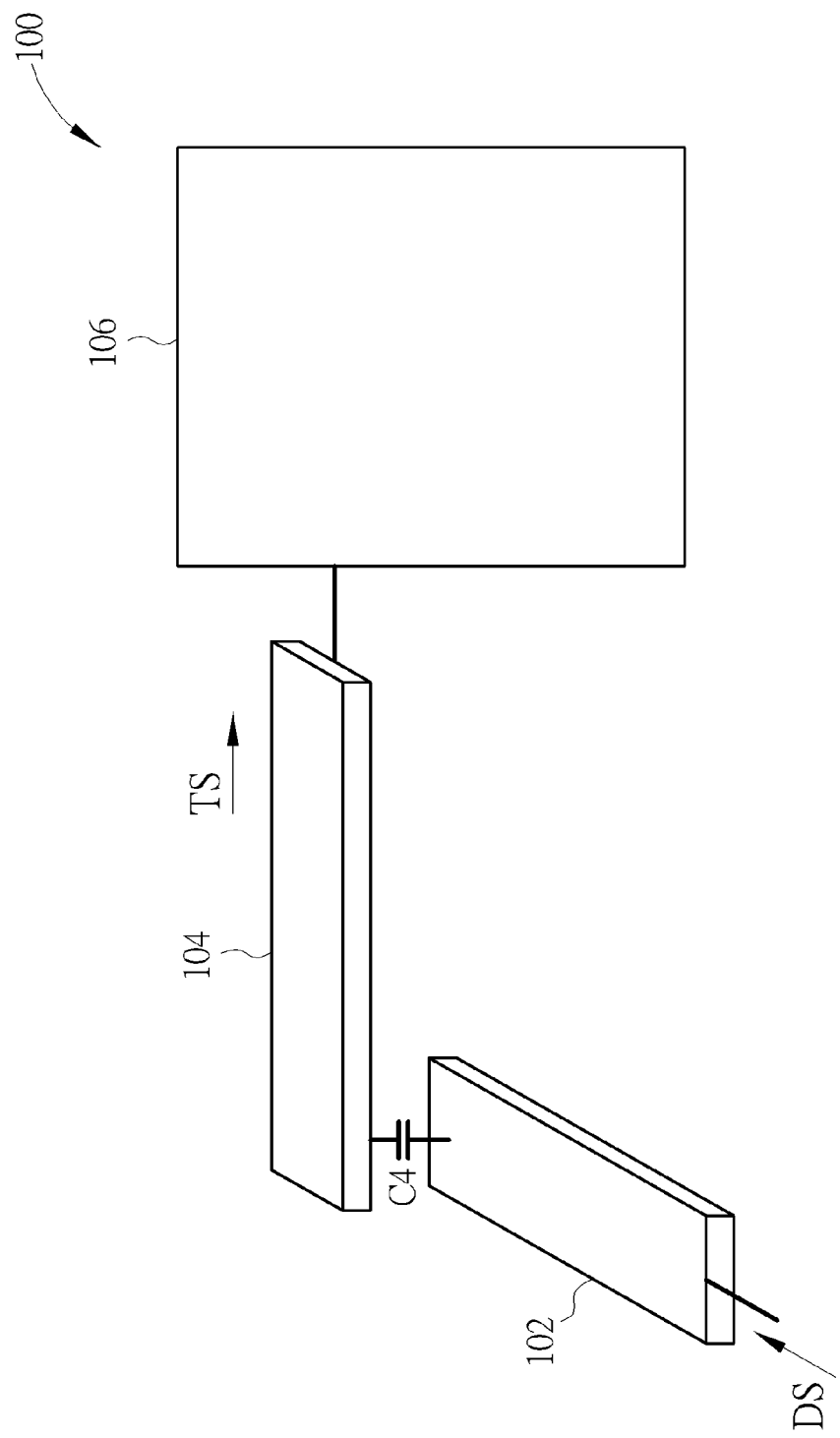
FIG. 1A shows a transmitting terminal conducting layer and a receiving terminal conducting layer in an in-cell touch display of prior art.
Figure 1B:
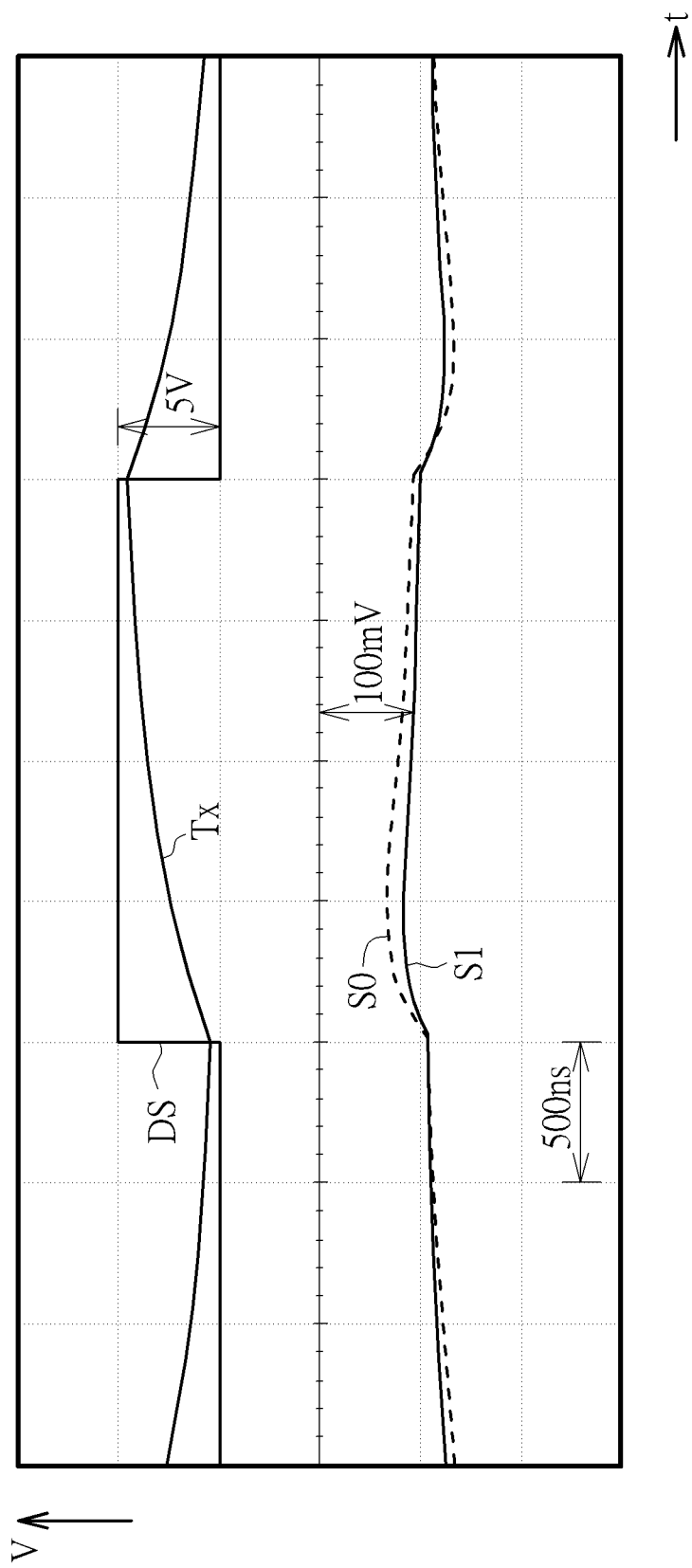
FIG. 1B is a timing diagram of the signals of the touch display in FIG. 1A.
Figure 2:
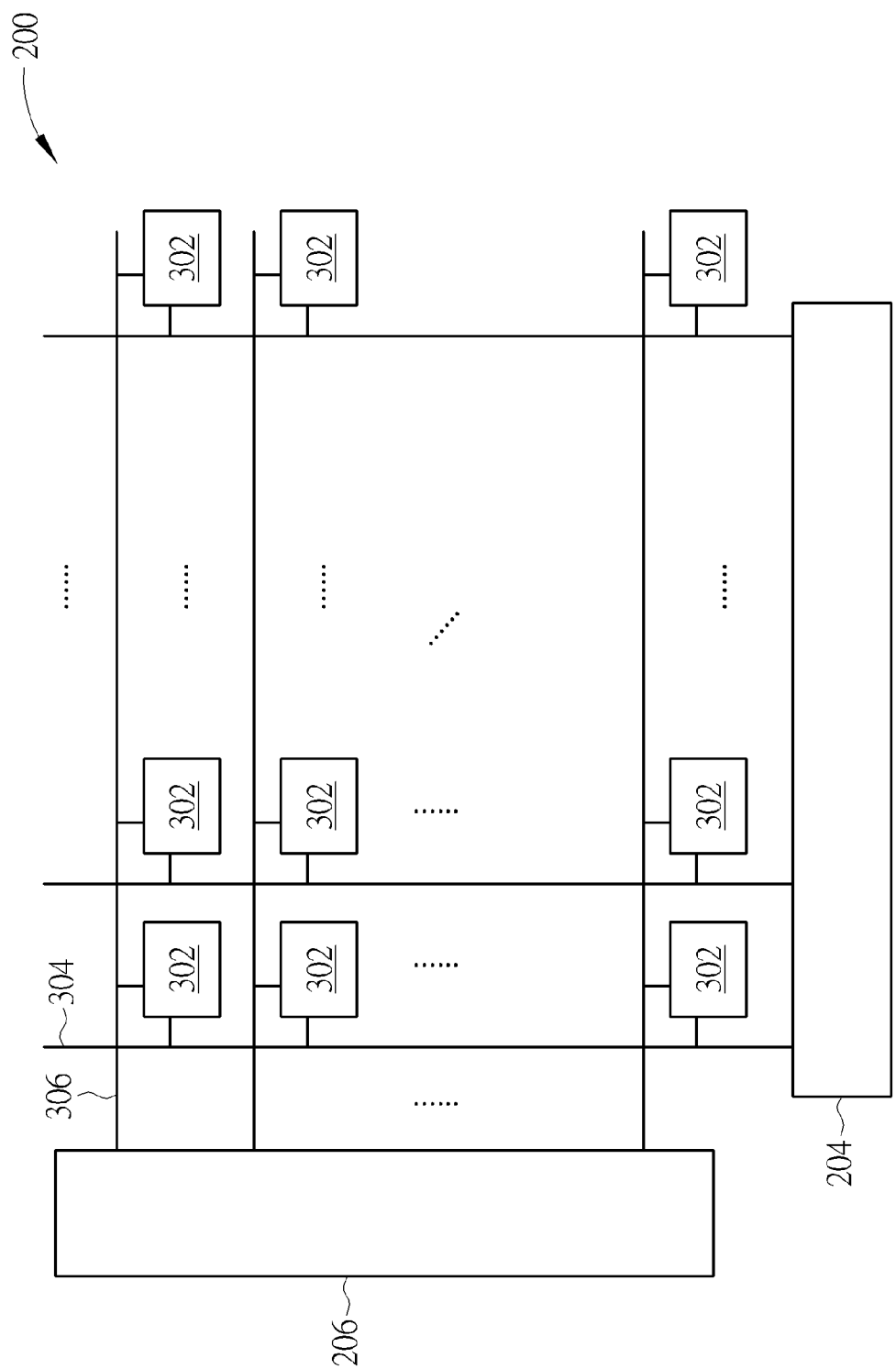
FIG. 2 shows a touch display according to an embodiment of the present invention.
Figure 3:
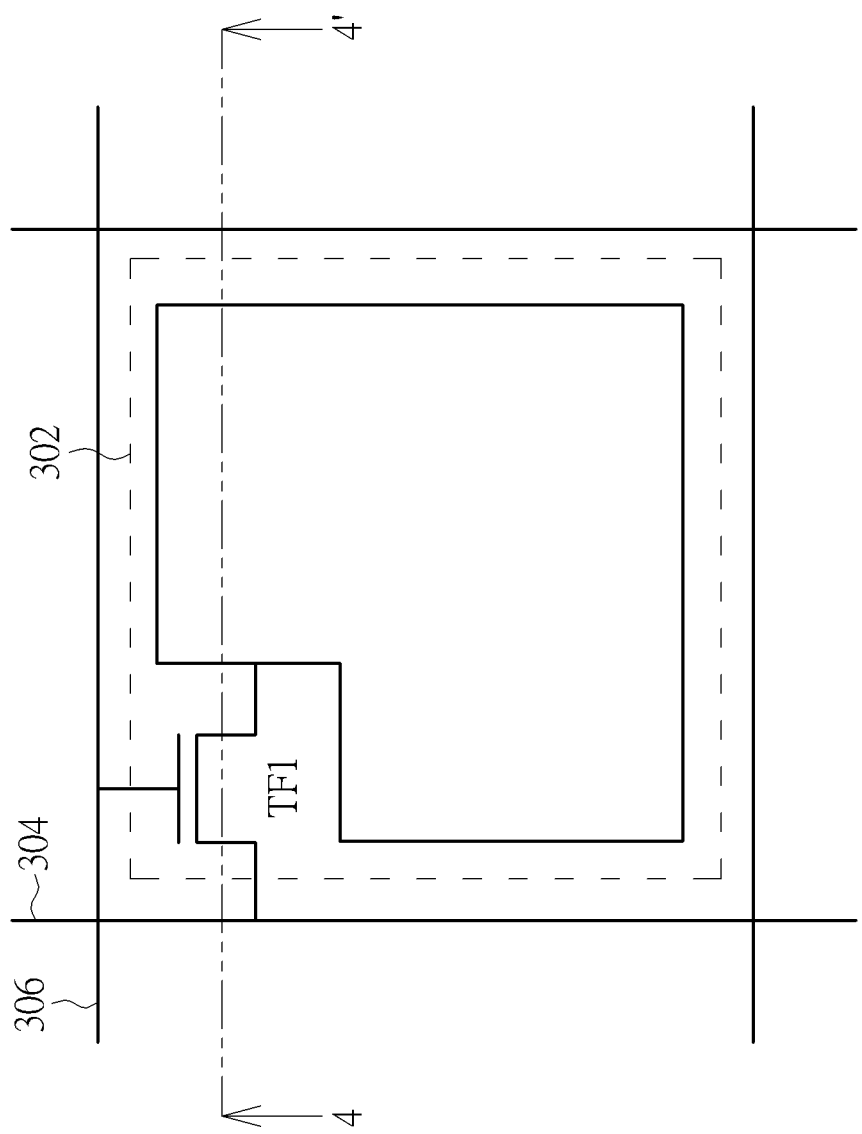
FIG. 3 shows a pixel of a touch display of FIG. 2 according to an embodiment of the present invention.

FIG. 2 shows a touch display 200 according to an embodiment of the present invention. The touch display 200 comprises a plurality of pixels 302, a plurality of data lines 304, a plurality of scan lines 306, a data driver 204, and a scan driver 206. The scan driver 206 is electrically coupled to a plurality of scan lines 306 for driving the plurality of scan lines 306 in a plurality of horizontal refresh periods of a plurality of frame periods so as to update the pixels 302 electrically coupled to the plurality of scan lines 306. The data driver 204 is electrically coupled to a plurality of data lines 304 for driving the plurality of data lines 304 in each of the horizontal refresh period so as to provide image data to the pixels 302. FIG. 3 shows a pixel 302 of the touch display 200 according to an embodiment of the present invention. The transistor TF1 in the pixel 302 can be a thin film transistor (TFT).

Figure 4:
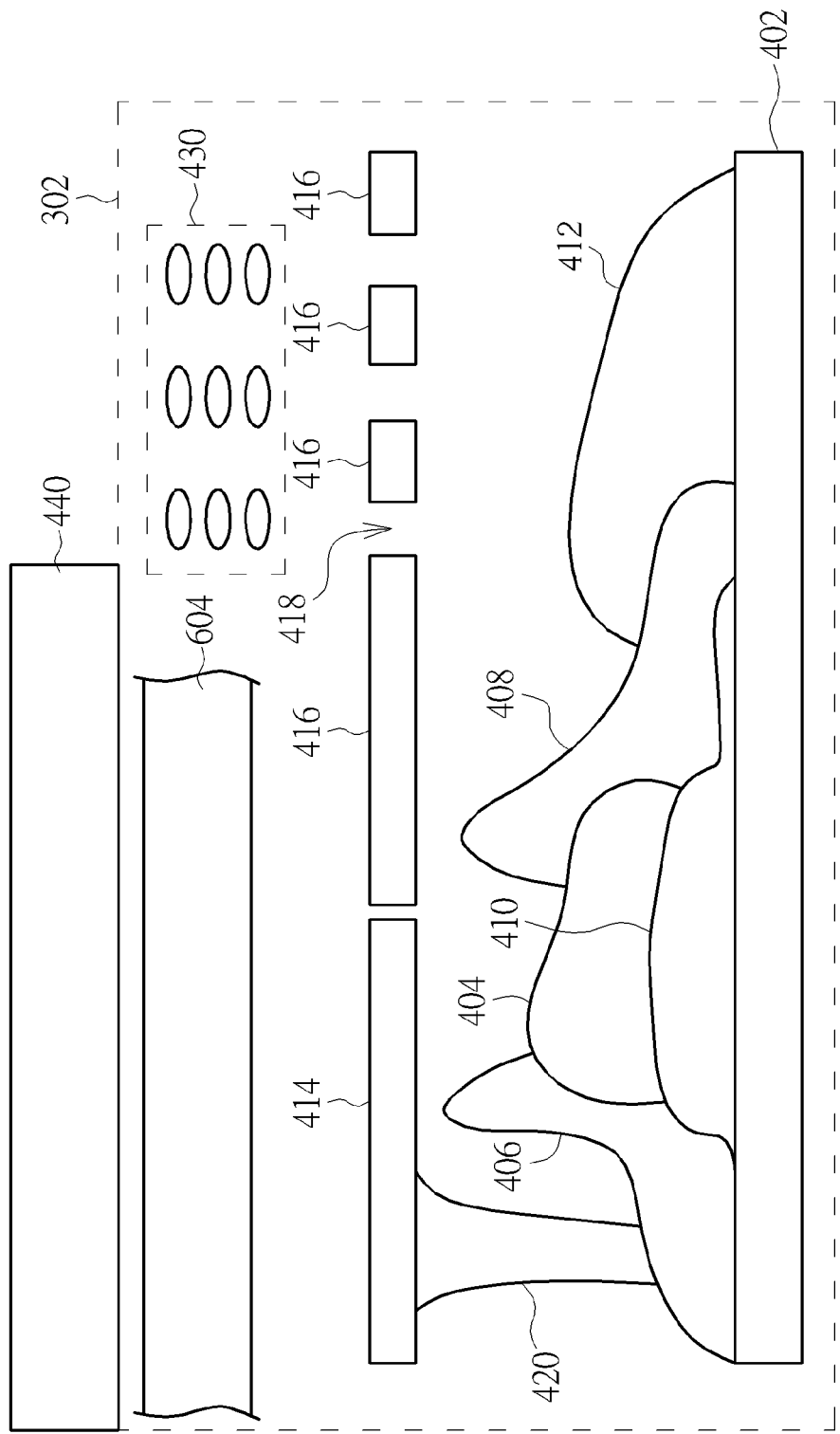
FIG. 4 is a cross-sectional view of the pixel along the broken line 4-4' in FIG. 3 according to an embodiment of the present invention.

FIG. 4 is a cross-sectional view of the pixel 302 along the broken line 4-4' in FIG. 3. The pixel 302 comprises a substrate 402, a semiconductor layer 404, a first electrode 406, a second electrode 408, a gate electrode 410, a pixel electrode 412, a first conducting layer 414, a second conducting layer 416, a liquid crystal layer 430, and a third conducting layer 604. The pixel electrode 412, the first conducting layer 414, and the second conducting layer 416 can be made of Indium Tin Oxide (ITO).

The transistor TF1 in FIG. 3 comprises the semiconductor layer 404, the first electrode 406, the second electrode 408, and the gate electrode 410 in FIG. 4. The first electrode 406 is formed at a side of the semiconductor layer 404 and can be a source terminal the transistor TF1. The first electrode 406 is electrically coupled to the data line 304 in FIG. 3. The second electrode 408 is formed at another side of the semiconductor layer 404 opposite to the first electrode 406. The second electrode 408 can be a drain terminal of the transistor TF1. The gate electrode 410 is formed at a side of the semiconductor layer 404, electrically coupled to the scan line 306 in FIG. 3 for controlling the on and off of the transistor TF1.

The pixel electrode 412 is electrically coupled to the second electrode 408. The first conducting layer 414 is formed at a side of the transistor TF1 opposite to the substrate 402, and electrically coupled to the first electrode 406 through a via 420 to function as a transmitting terminal conducting layer of the touch display 200. The second conducting layer 416 is formed at a side of the first conducting layer 414, insulated from the first conducting layer 414, and function as a common electrode layer of the pixel 302. The first conducting layer 414 and the second conducting layer 416 are made by partitioning off a same layer of ITO (Indium Tin Oxide) to function as a transmitting terminal conducting layer and a common electrode layer respectively. The liquid crystal layer 430 can be formed at a side of the second conducting layer 416 opposite to the pixel electrode 412, and at least an opening 418 can be formed on the second conducting layer 416 to allow an electric field generated by the second conducting layer 416 and the pixel electrode 412 to pass though so as to drive the liquid crystal layer 430.

Moreover, the first conducting layer 414 can be formed under a black matrix 440. Hence, although an electromagnetic signal TX generated by the first conducting layer 414 after the first conducting layer 414 receives a touch driving signal DS might affect liquid crystals, the effect is limited to the areas under the black matrix 440, minimizing its impact to the display of the touch display 200. In this way, the present invention better protects the images displayed on the touch display 200. Besides, the first conducting layer 414 can also be made of an opaque material. The via 420 can be formed within a region defined by projecting the black matrix 440 onto the substrate 402.

Figure 5:
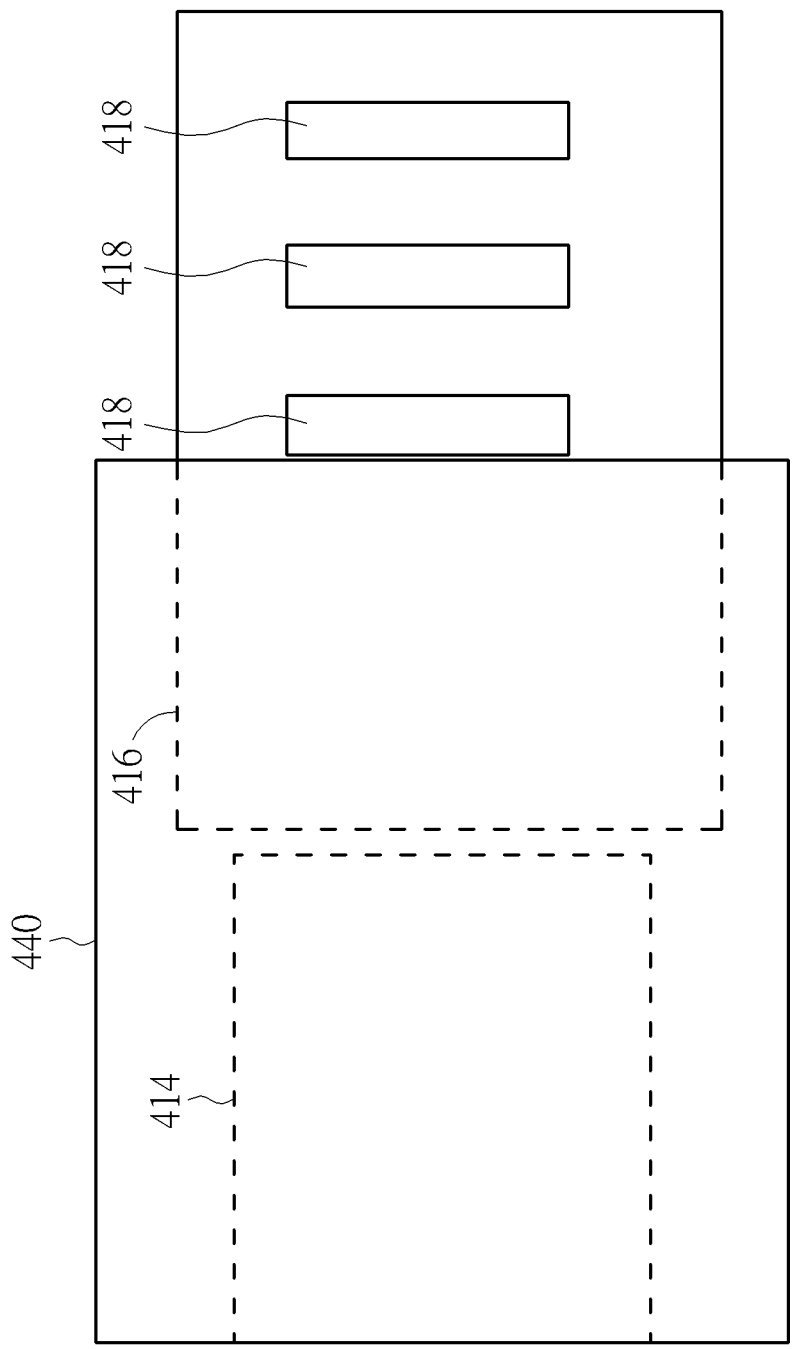
FIG. 5 is a top view of the pixel in FIG. 4 according to an embodiment of the present invention.

FIG. 5 is a top view of the pixel 302 in FIG. 4 according to an embodiment of the present invention. FIG. 5 shows that the first conducting layer 414 and the second conducting layer 416 are insulated from one another.

Through the via 420, the first conducting layer 414 in FIG. 4 is electrically coupled to the first electrode 406, the source terminal of the transistor TF1, thus to its corresponding data line 304. In addition to provide image data to the data line 304, the data driver 204 outputs touch driving signals DS to the first conducting layer 414 through the data line 304 in a horizontal blanking period between two horizontal refresh periods and/or in a vertical blanking period between two frame periods.

Figure 6:
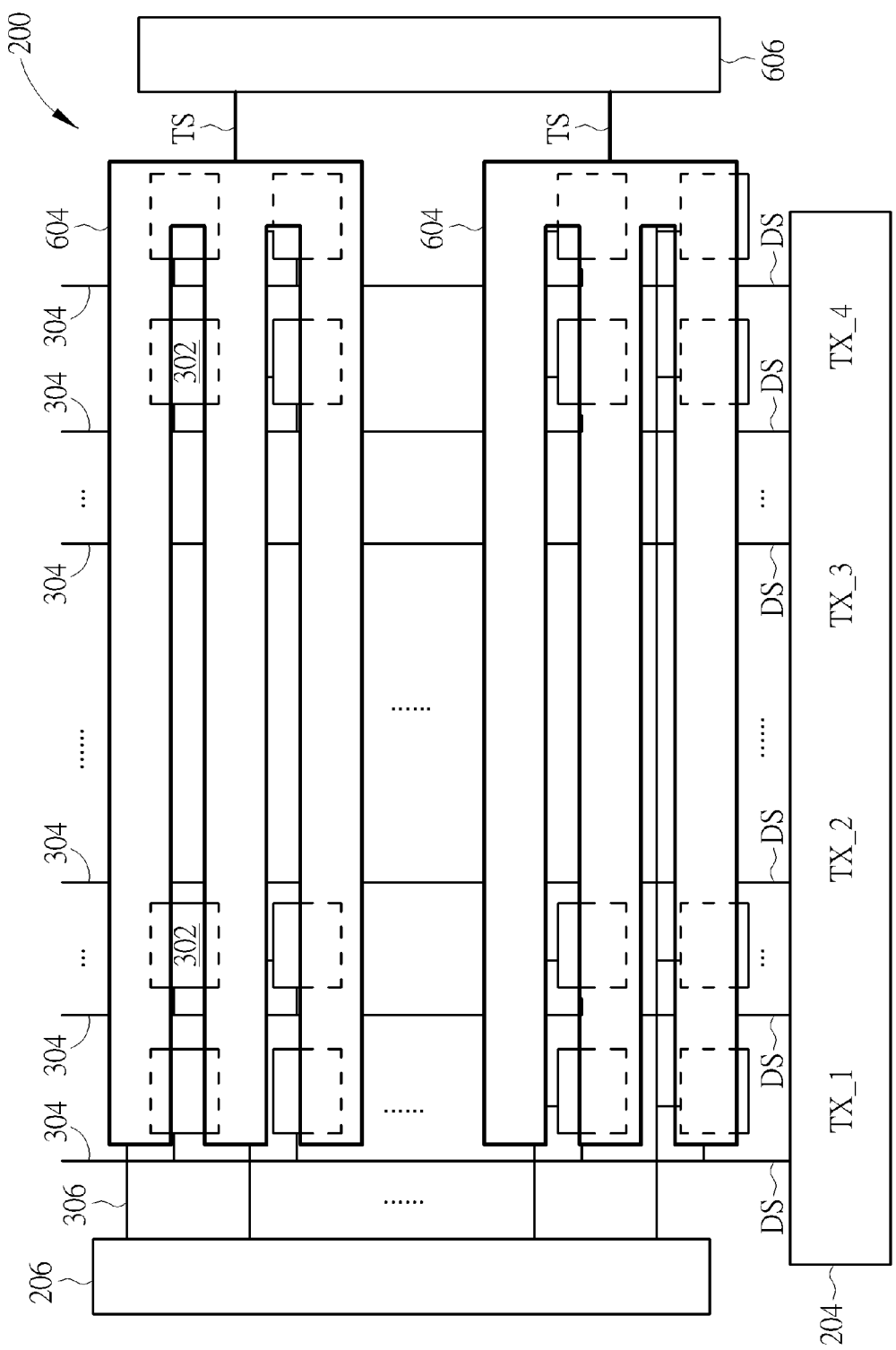
FIG. 6 is a top view of the touch display in FIG. 2 according to another embodiment of the present invention.

FIG. 6 is a top view of the touch display 200 in FIG. 2 according to another embodiment of the present invention. FIG. 6 shows a plurality of third conducting layers 604 formed above the pixels 302. FIG. 4 shows that the third conducting layer 604 is formed at a side of the first conducting layer 414 opposite to the substrate 402. The third conducting layer 604 can be used to sense a touch driving signal DS received by the first conducting layer 414 formed below or close to the third conducting layer 604 so as to output a touch sensing signal TS accordingly. The touch display 200 further comprises a touch control unit 606 electrically coupled to the third conducting layers 604 for receiving the touch sensing signals TS generated by the third conducting layers 604 so as to determine positions on the touch display 200 triggered by the user.

The data lines 304 of the touch display 200 can be grouped into N groups. For example, the data lines 304 can be grouped into four groups: TX_1, TX_2, TX_3, and TX_4. Each of the groups comprises a plurality of data lines 304. The plurality of data lines 304 are not separated by any data line 304 of another group and are arranged in sequence from a first side of the touch display 200 toward another side opposite to the first side, such as from the left side towards the right side. The data lines 304 in each of the groups can include a plurality of sets of RGB (red, green, and blue) data lines 304 and can be arranged in a repetitive sequence such as repetition of red, green and blue colors.

The data driver 204 can output touch driving signals DS to the first conducting layers 414 through the N groups of data lines 304 in N periods. The data lines 304 of the same group transmit touch driving signals DS to respective first conducting layers 414 simultaneously in the same period. And the third conducting layers 604 simultaneously respond to the touch driving signals DS received by a plurality of first conducting layers 414 corresponding to the same group of data lines so as to generate touch sensing signals TS of optimized magnitudes. After a group of data lines 304 outputs touch driving signals DS, touch sensing signals TS generated by the third conducting layers 604 are inputted into the touch control unit 606 to determine the position on the touch display 200 triggered by a user.

Figure 7:
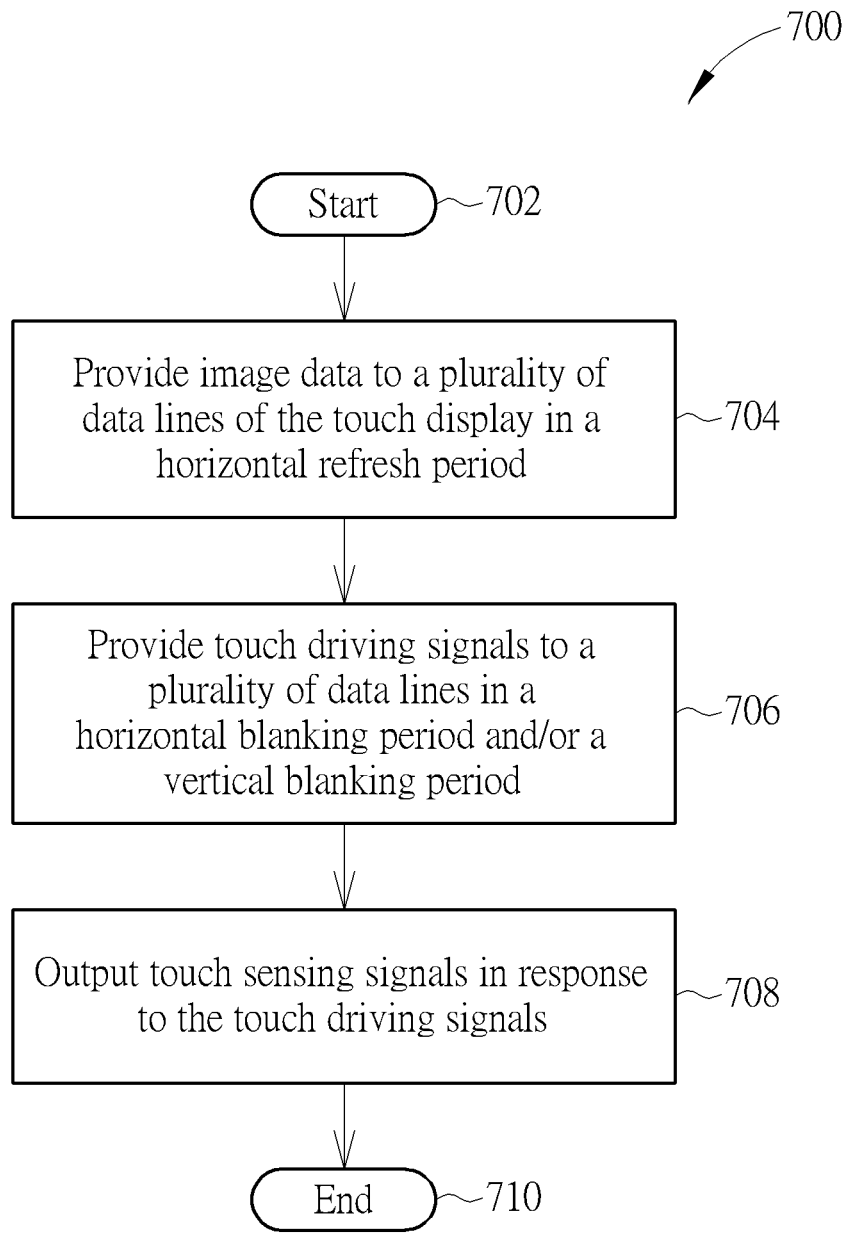
FIG. 7 is a flowchart of a method for driving the touch display in FIG. 6 according to an embodiment of the present invention.

FIG. 7 is a flowchart of a method 700 for driving the touch display 200 in FIG. 6 according to an embodiment of the present invention. The method 700 comprises:

Step 702: start;
Step 704: provide image data to a plurality of data lines 304 of the touch display 200 in a horizontal refresh period;
Step 706: provide touch driving signals DS to a plurality of data lines 304 in a horizontal blanking period and/or a vertical blanking period;
Step 708: output touch sensing signals TS in response to the touch driving signals DS;
Step 710: end.

In Step 708, the touch sensing signals TS can be generated by one or more third conducting layers 604 by sensing the touch driving signals DS outputted to the first conducting layers 414 through the data lines 304.

Figure 8:
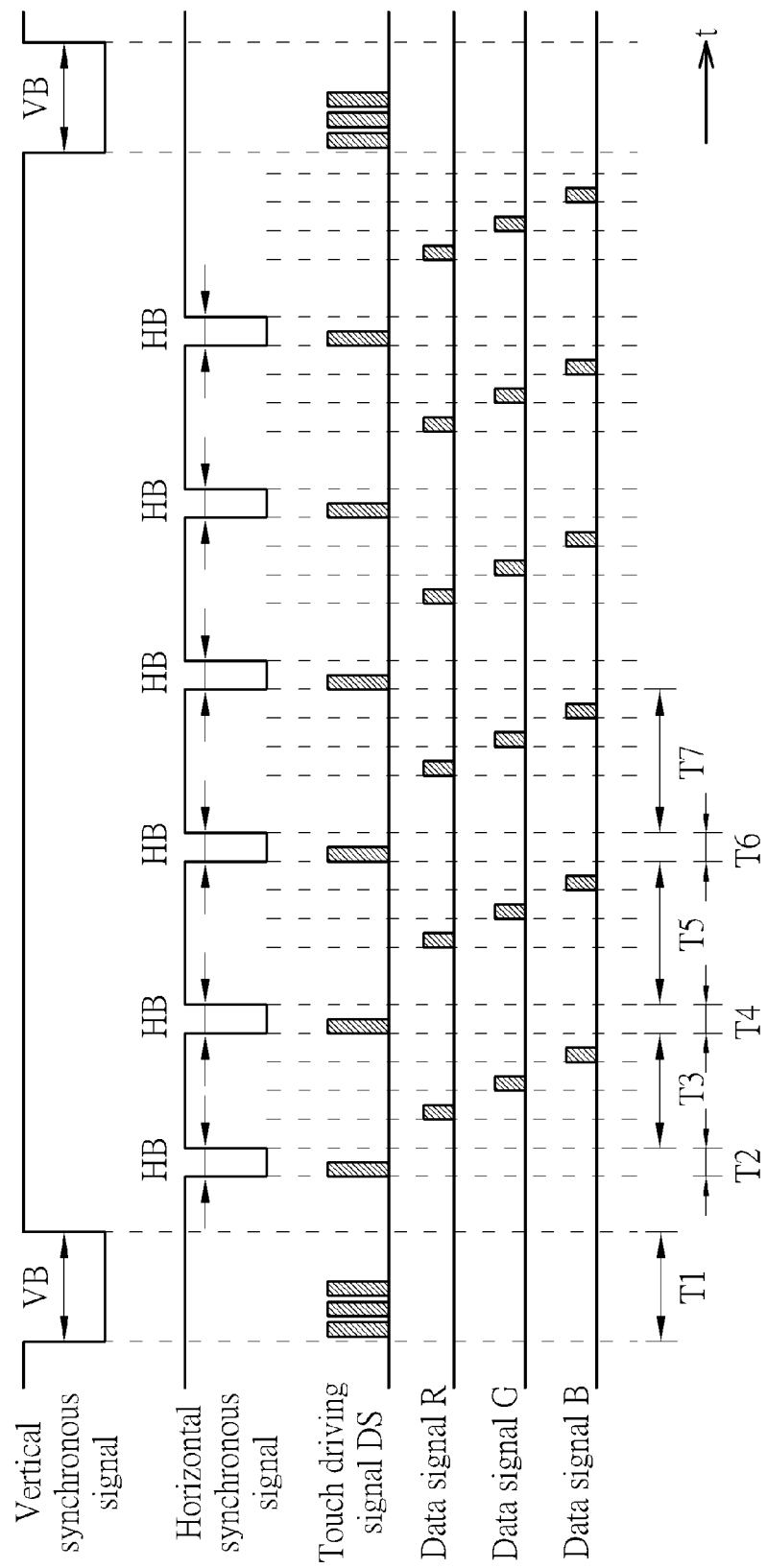
FIG. 8 is a timing diagram of the method in FIG. 7 according to an embodiment of the present invention.

FIG. 8 is a timing diagram of the method 700 in FIG. 7 according to an embodiment of the present invention. The horizontal axis in FIG. 8 refers to time t. From top to bottom, a vertical synchronous signal, a horizontal synchronous signal, the touch driving signal DS, data signals R (red data), data signals G (green data), and data signals B (blue data) are shown. As shown in FIG. 8, the time interval T1 is a "Vertical Blanking Period" (VB) between two consecutive frame periods. Each of the time intervals T2, T4 and T6 is a "Horizontal Blanking Period" (HB) between two consecutive horizontal refresh periods. Within these time intervals (such as T1, T2, T4 and T6), the data driver 204 can output touch driving signals DS to the first conducting layer 414 through the data lines 304. The first conducting layer 414 generates an electric field and magnetic field after receiving the touch driving signal DS, and then transmits the touch driving signal DS in the form of an electromagnetic field to be an electromagnetic signal Tx. Because the capacitance between the third conducting layer 604 and the first conducting layer 414 varies according to whether a corresponding position on the touch display 200 is touched by a user and the electromagnetic signal Tx sensed by the third conducting layer 604 varies with the capacitance, once the third conducting layer 604 generates the touch sensing signal TS according to the electromagnetic signal Tx, the touch control unit 606 can determine the position on the touch display 200 being touched by the user according to the electromagnetic signal Tx.

In other words, when a position on the touch display 200 is touched by the user, the capacitance between the first and the third conducting layers 414 and 604 corresponding to the position will change. This causes the pulses of the touch driving signal DS received by the first conducting layer 414 to change accordingly, causing the third conducting layer 604 to generate a corresponding touch sensing signal TS indicating that the position on the touch display 200 has been touched by the user.

The periods T3, T5 and T7 are horizontal refresh periods. For example, the period T3 is the horizontal refresh period for scanning the $m_{th}$ row, and the period T5 is the horizontal refresh period for scanning the $(m+1)_{th}$ row. During the period T3, T5, T7, the data driver 204 can sequentially output data signals R, G, and B to the data lines 304 so as to display image data on the pixels 302. In another embodiment, in a horizontal refresh period such as the period T3, T5 or T7, if there is a spare time after the data driver 204 outputs the data signal R and before the data driver 204 outputs the data signal G, the data driver 204 can output a touch driving signal DS during the spare time, so as the spare time after outputting a data signal G and before outputting a data signal B, the spare time after outputting a data signal B and before outputting a data signal R, and the spare time after outputting a data signal B and before the following horizontal blanking period.

Figure 9:
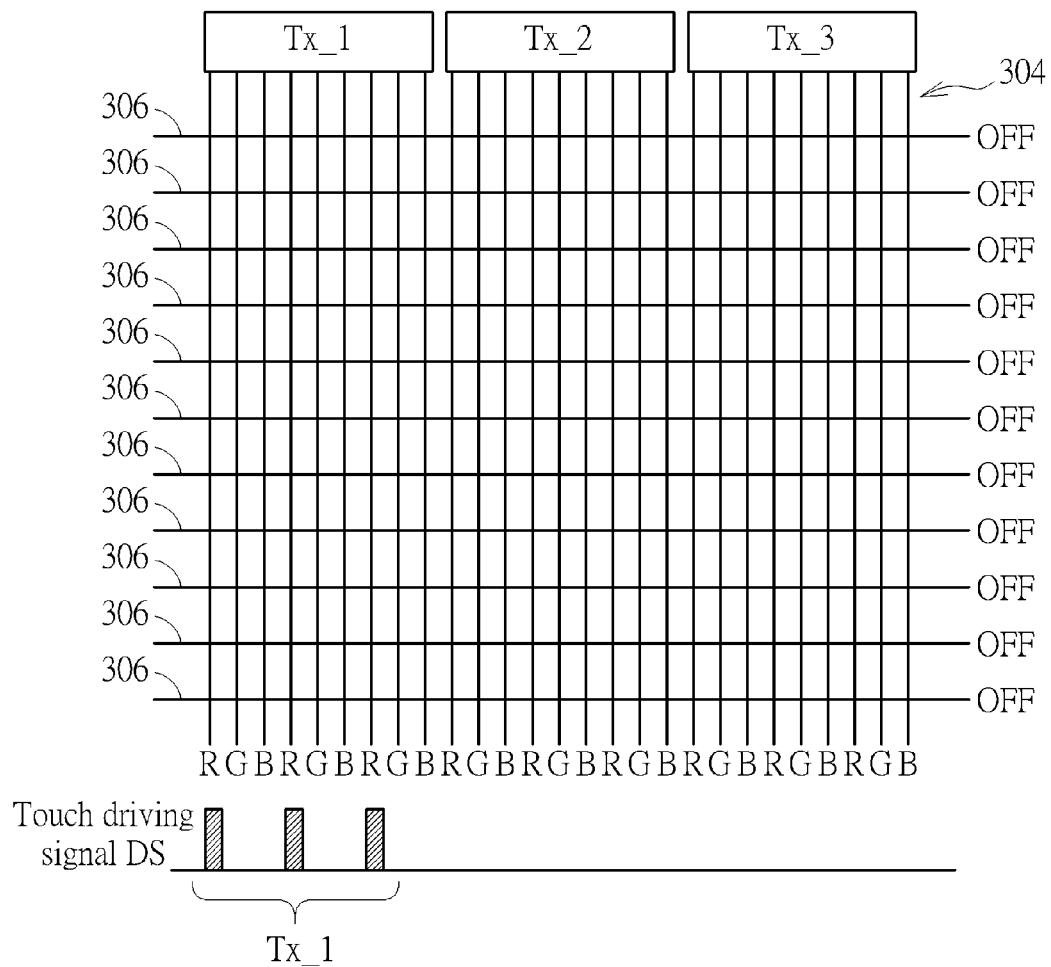
FIGS. 9 to 14 show a step-by-step process of the timing diagram in FIG. 8 according to an embodiment of the present invention.

FIG. 9 to FIG. 14 show a step-by-step process of the timing diagram in FIG. 8 according to an embodiment of the present invention. In FIG. 9-FIG. 14, the touch display 200 has three groups of data lines TX_1, TX_2, and TX_3, and data lines 304 in each group are arranged in the sequence of R, G, and B. The plurality of scan lines 306 are substantially perpendicular to the plurality of data lines 304. FIG. 9 shows that in period T2 of FIG. 8, a horizontal blanking period where none of the scan lines 306 is scanned, the data driver 204 simultaneously outputs touch driving signals DS to a plurality of data lines 304 of the group TX_1 which are used to transmit red data.

Figure 10:
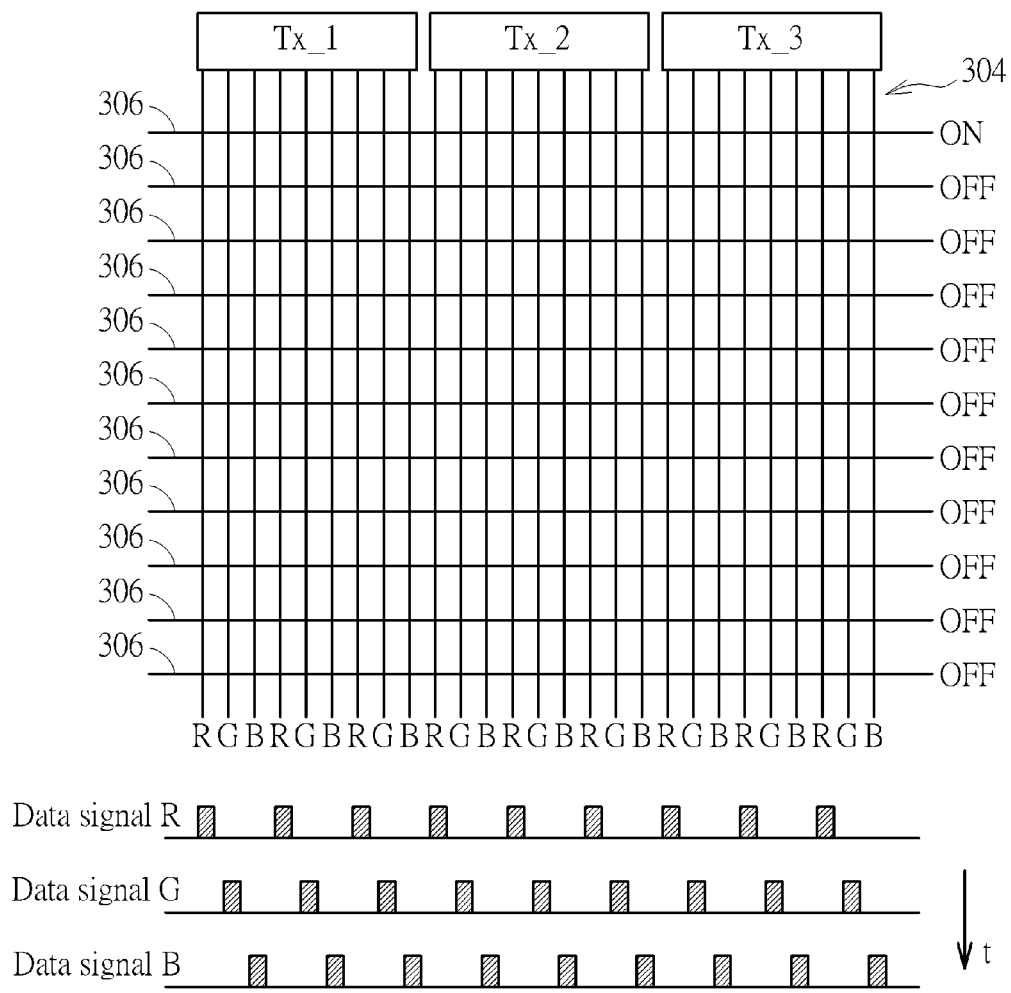

FIG. 10 shows that in period T3 of FIG. 8, the horizontal refresh period where the $m_{th}$ row is scanned, the data driver 204 sequentially outputs data signals R, data signals G, and data signals B to the corresponding data lines 304 of all groups so as to refresh image data of the $m_{th}$ row.

Figure 11:
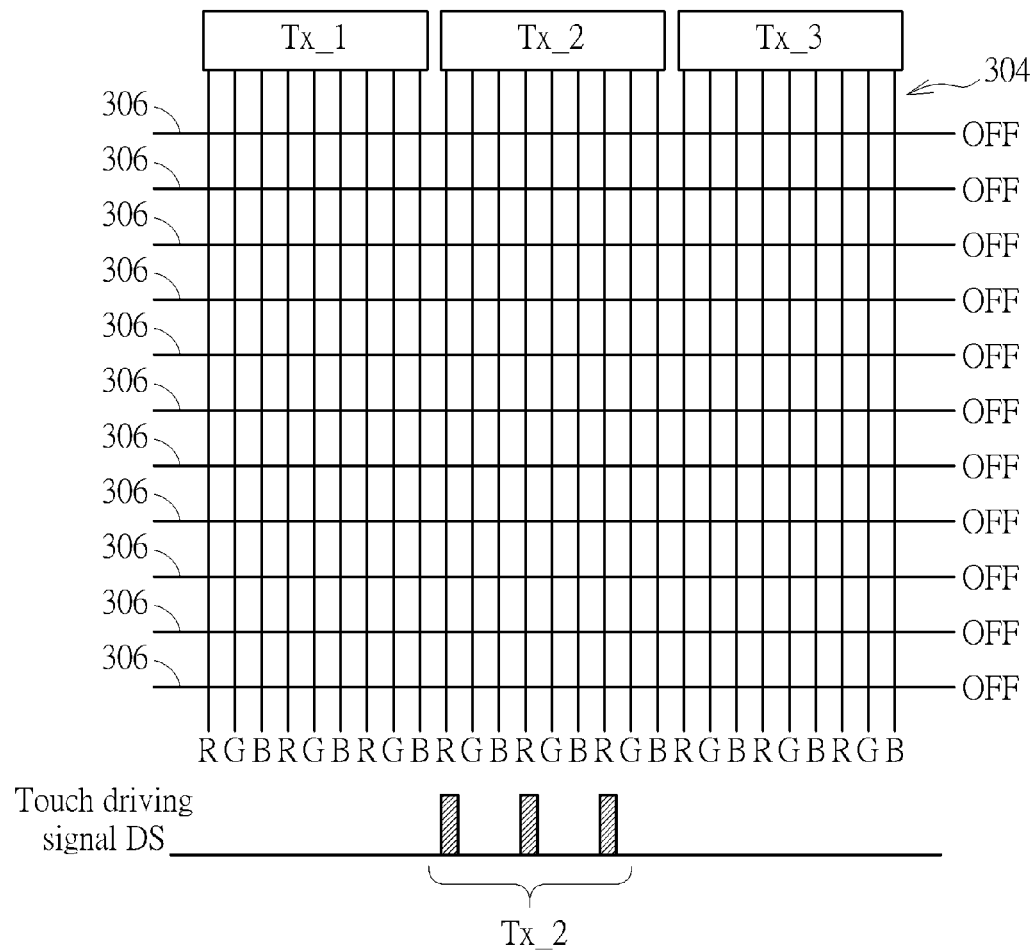

FIG. 11 shows that in period T4 of FIG. 8, the horizontal blanking period after the period T3, the data driver 204 simultaneously outputs touch driving signals DS to the data lines 304 of the group TX_2 used to transmit red data.

Figure 12:
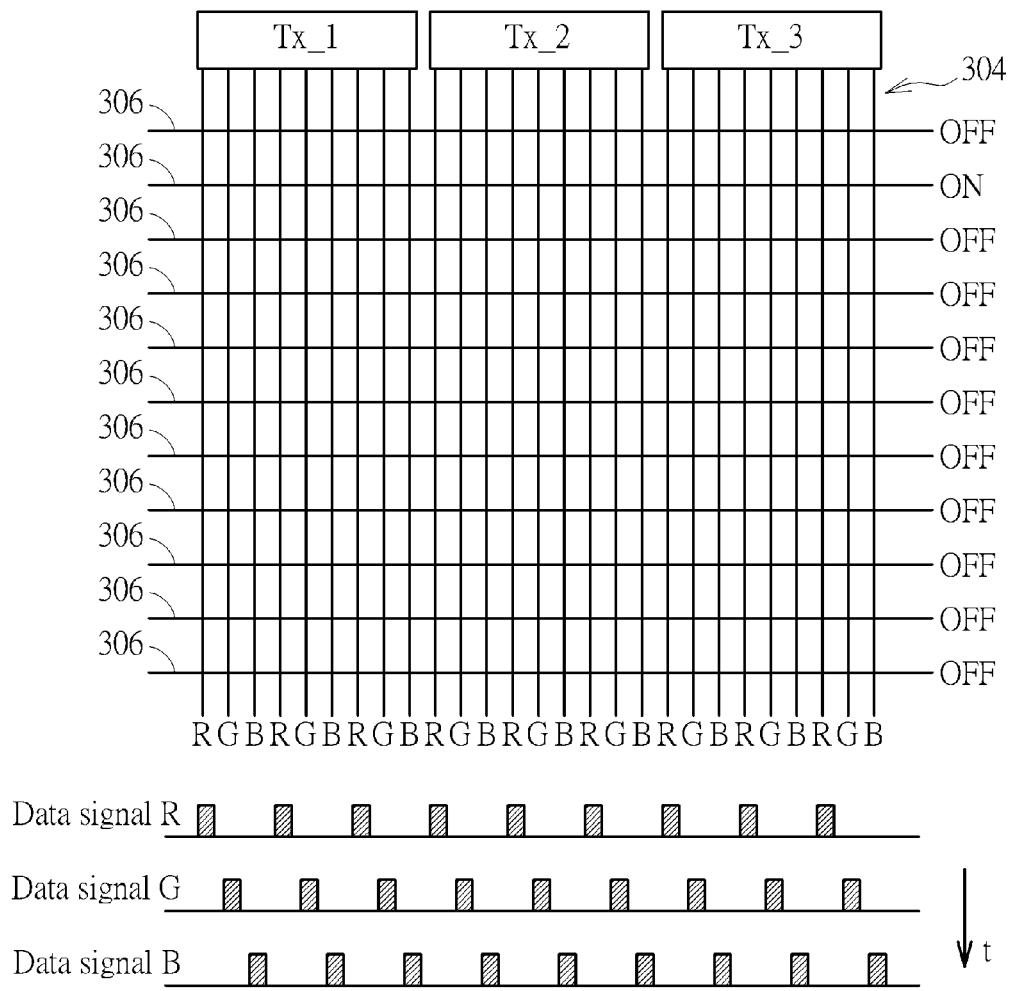

FIG. 12 shows that in period T5 of FIG. 8, the horizontal refresh period where the $(m+1)_{th}$ row is scanned, the data driver 204 sequentially outputs data signals R, data signals G, and data signals B to the data lines 304 of all groups so as to refresh image data of the $(m+1)_{th}$ row.

Figure 13:
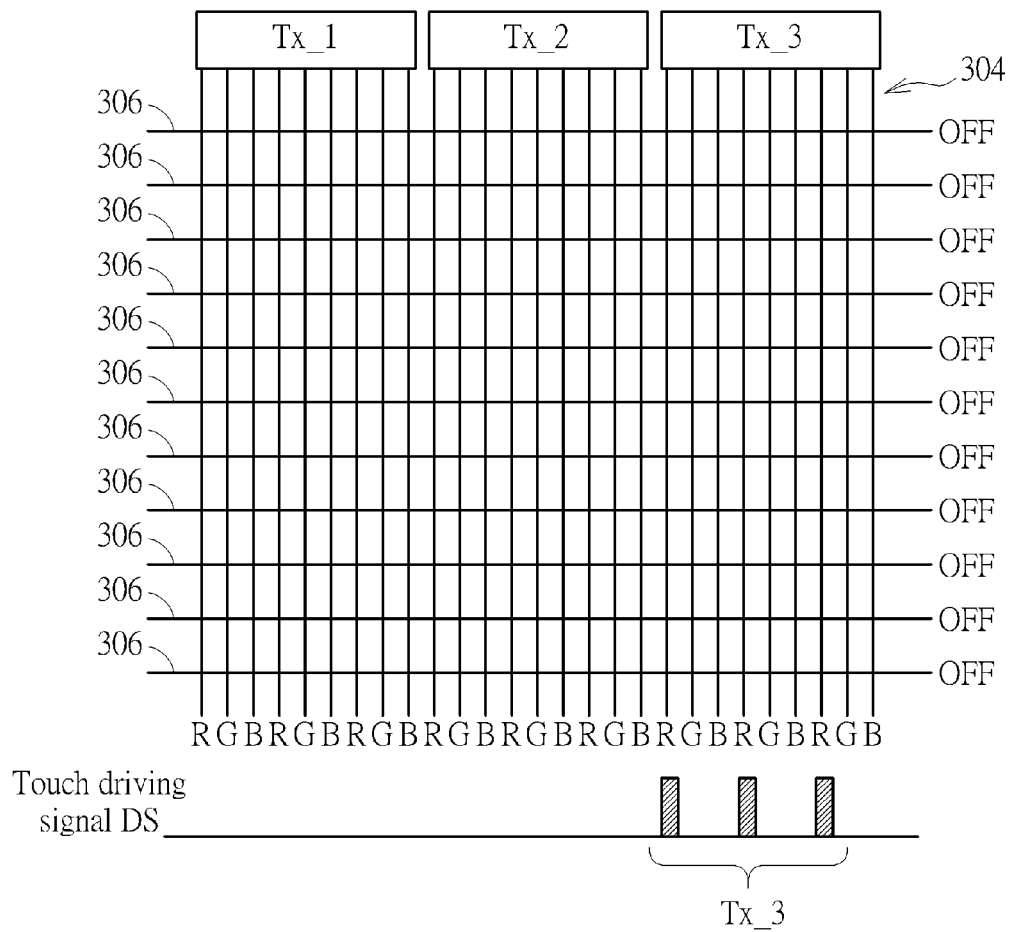

FIG. 13 shows that in period T6 of FIG. 8, the horizontal blanking period after the period T5, the data driver 204 simultaneously outputs touch driving signals DS to the data lines 304 of the group TX_3 used transmit red data.

Figure 14:
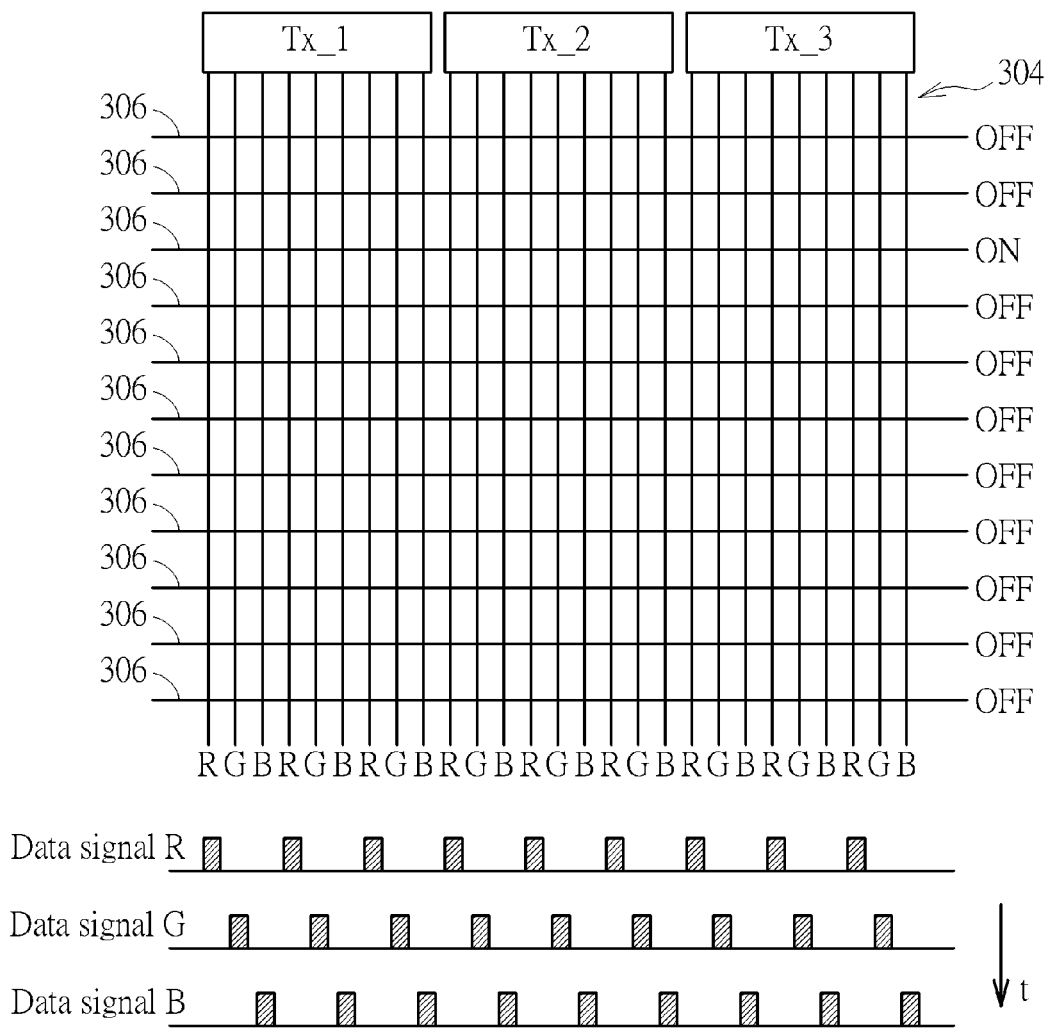

FIG. 14 shows that in period T7 of FIG. 8, the horizontal refresh period where the $(m+2)_{th}$ row is scanned, the data driver 204 sequentially outputs data signals R, data signals G, and data signals B to the data lines 304 of all groups so as to refresh image data of the $(m+2)_{th}$ row. However, the present invention is not only limited to the above mentioned embodiments. The data driver 204 can also output data driving signals DS to the data lines 304 used to transmit green data or blue data. In another embodiment, if there is enough time in the horizontal blanking periods such as T2, T4 and T6, the data driver 204 can sequentially output touch driving signals DS to groups TX_1, TX_2, and TX_3 in the same horizontal blanking period.

Figure 15:
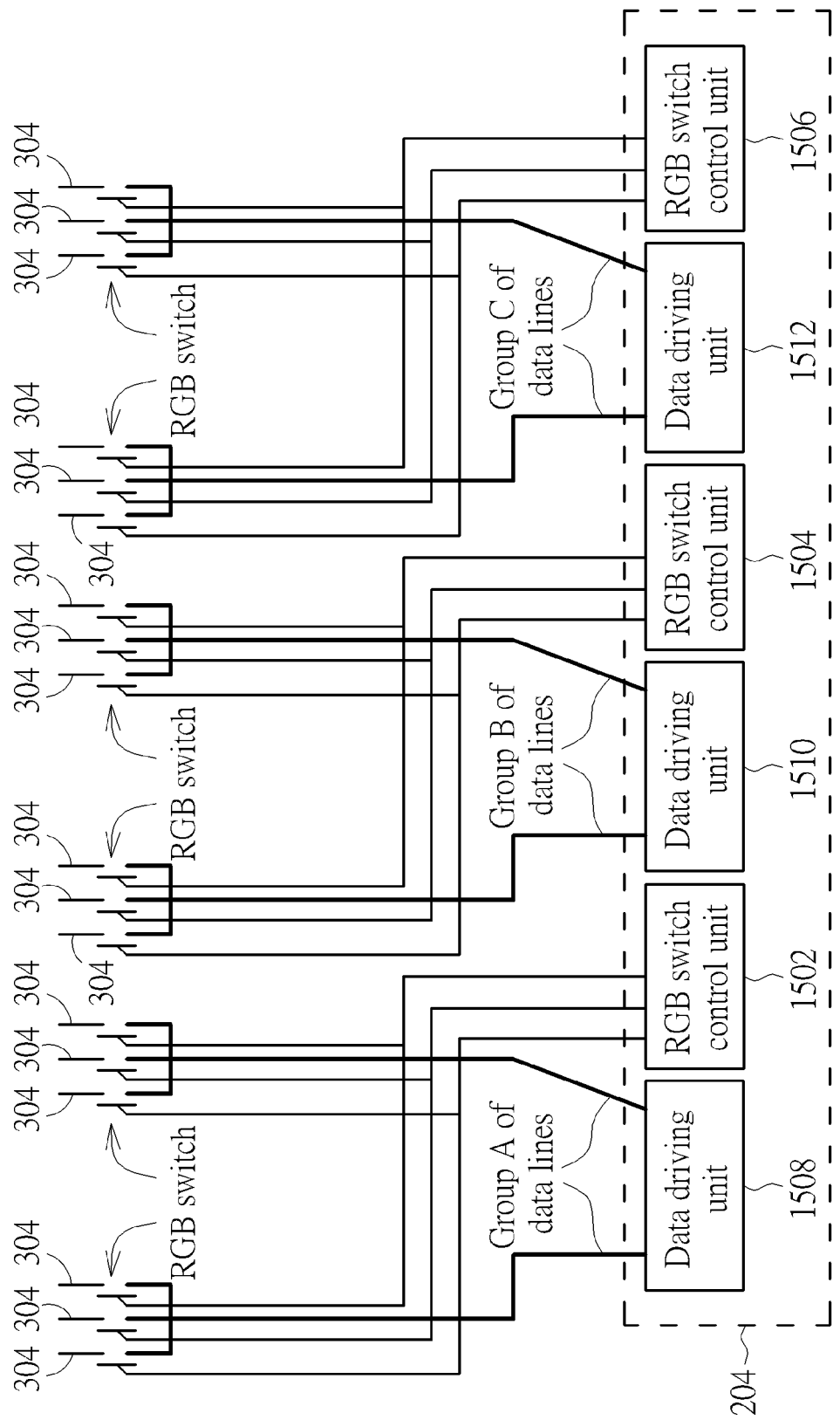
FIG. 15 shows a structure of the touch display in FIG. 2 implemented to output touch driving signals to data lines of N groups in N periods respectively according to an embodiment of the present invention.

FIG. 15 shows a structure of the touch display 200 implemented to output touch driving signals DS to the data lines 304 of N groups in N periods respectively according to an embodiment of the present invention. In the structure, the data lines 304 of the touch display 200 of FIG. 6 are grouped into N groups, and each of the N groups comprises a plurality of data lines 304. The data driver 204 comprises a plurality of RGB switch control units 1502, 1504, and 1506 and a plurality of data driving units 1508, 1510, and 1512. For example, group A of data lines can be controlled with the data driving unit 1508 and the RGB switch control unit 1502, group B of data lines can be controlled with the data driving unit 1510 and the RGB switch control unit 1504, and group C of data lines can be controlled with the data driving unit 1512 and the RGB switch control unit 1506. In the horizontal blanking period T2, only the RGB switches controlled with the RGB switch control unit 1502 are conductive so that the data driving unit 1508 is able to output touch driving signals DS to group A of data lines 304. In the horizontal blanking period T4, only the RGB switches controlled with the RGB switch control unit 1504 are conductive so that the data driving unit 1510 is able to output touch driving signals DS to group B of data lines 304. In the horizontal blanking period T6, only the RGB switches controlled with the RGB switch control unit 1506 are conductive so that the data driving unit 1512 is able to output touch driving signals DS to group C of data lines 304.

Figure 16:
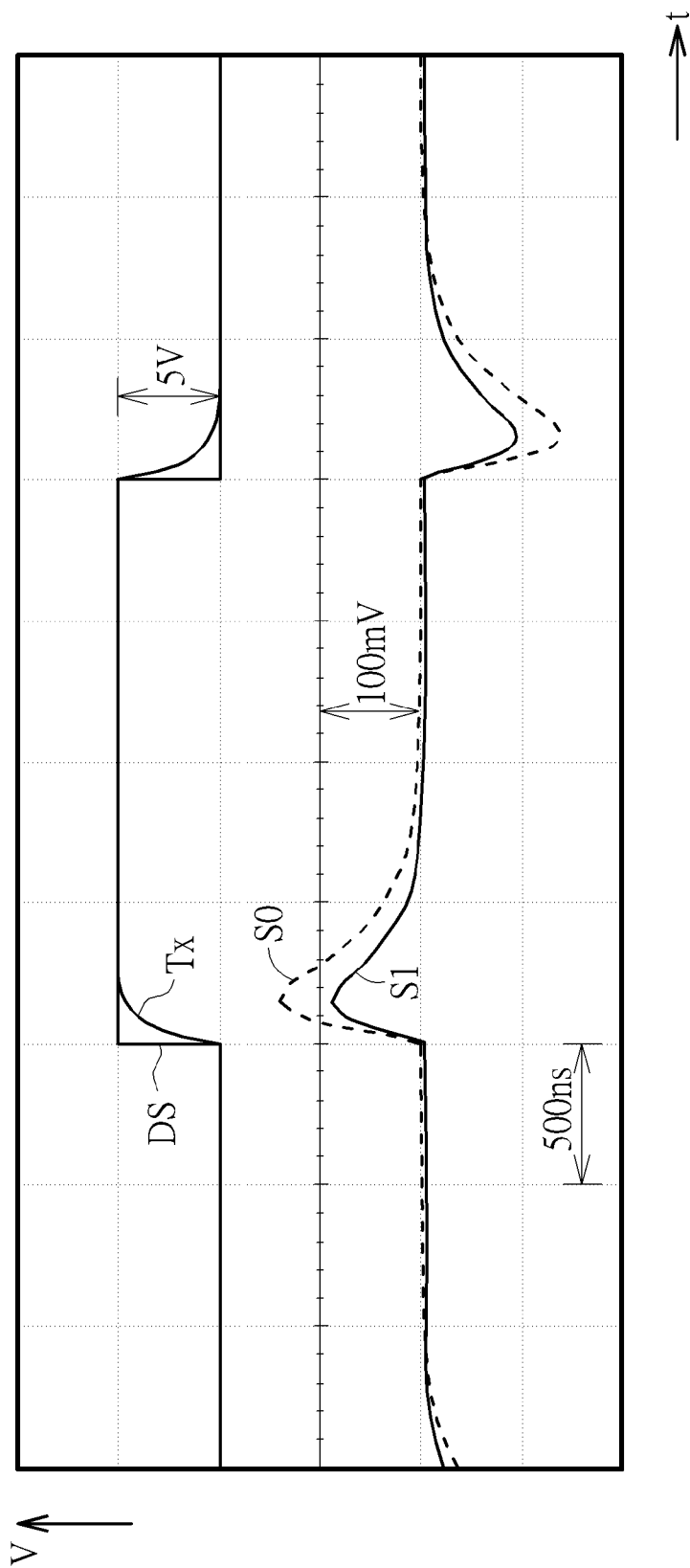
FIG. 16 is a timing diagram of the touch display of FIG. 6 according to an embodiment of the present invention.

FIG. 16 is a timing diagram of the touch display 200 of FIG. 6 according to an embodiment of the present invention. As shown in FIG. 16, the broken line S0 refers to a touch sensing signal in response to an untouched position of the touch display, and the solid line S1 refers to a touch sensing signal S1 in response to a touched position of the touch display. It is clear that the difference between the broken line S0 and the solid line S1 is a lot more eminent than that of the prior art. That means the variation of capacitance has increased dramatically, improving the sensitivity of the touch display 200.

In conclusion, the in-cell touch display of the present invention can improve the sensitivity of the positions touched by the user. Besides, the data lines of the in-cell touch display of the present invention can output data signals and the touch driving signals indifferent time intervals because the touch control function is integrated to the data driver, simplifying the structure of the touch display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display comprising:
    a substrate;
    a plurality of pixels, formed at one side of the substrate, each of the plurality of pixels comprising:
        a transistor comprising:
            a semiconductor layer;
            a first electrode formed at a first side of the semiconductor layer;
            a second electrode formed at a second side of the semiconductor layer, the second side of the semiconductor layer being opposite to the first side of the semiconductor layer; and
            a gate electrode formed at a third side of the semiconductor layer and configured to control the transistor to turn on and turn off;
        a pixel electrode electrically coupled to the second electrode;
        a first conducting layer formed at a side of the transistor opposite to the substrate, electrically coupled to the first electrode through a via, and configured to receive a touch driving signal; and
        a second conducting layer formed at a side of the first conducting layer, insulated from the first conducting layer, and configured to generate an electrical field with the pixel electrode so as to drive a liquid crystal layer; and
    a plurality of third conducting layers formed at a side of the pixels opposite to the substrate, each of the plurality of third conducting layers being configured to output a touch sensing signal in response to a plurality of touch driving signals received by a plurality of first conducting layers of the pixels.

2. The touch display of claim 1 wherein the liquid crystal layer is formed at a side of the second conducting layer opposite to the pixel electrode, and the second conducting layer has at least one opening configured to allow the electrical field generated by the second conducting layer and the pixel electrode to pass through.

3. The touch display of claim 2 further comprising:
    a plurality of data lines each coupled to a plurality of corresponding first electrodes; and
    a data driver electrically coupled to the data lines and configured to provide image data to the data lines and the touch driving signals to the first conducting layers through the data lines.

4. The touch display of claim 3 further comprising a black matrix wherein the via is formed within a region defined by projecting the black matrix onto the substrate.

5. The touch display of claim 1 further comprising:
    a plurality of data lines each coupled to a plurality of corresponding first electrodes; and
    a data driver electrically coupled to the data lines and configured to control the data lines to provide image data and the touch driving signals received by the first conducting layers.

6. The touch display of claim 1 further comprising a black matrix wherein the via is formed within a region defined by projecting the black matrix onto the substrate.

7. A touch display comprising:
    a plurality of pixels;
    a plurality of scan lines electrically coupled to the pixels;
    a plurality of first conducting layers each configured to receive a touch driving signal;
    a plurality of data lines electrically coupled to the pixels and the first conducting layers and configured to provide image data of the pixels and provide a plurality of touch driving signals to the first conducting layers; and a plurality of third conducting layers formed at one side of the first conducting layers, each of the plurality of third conducting layers being configured to output a touch sensing signal in response to the touch driving signals received by the first conducting layers.

8. The touch display of claim 7 further comprising:

a scan driver electrically coupled to the scan lines and configured to drive the scan lines sequentially in a plurality of horizontal refresh periods of a plurality of frame periods in order to update the pixels electrically coupled to the scan lines; and a data driver electrically coupled to the data lines, configured to provide the image data to the data lines within the horizontal refresh periods, and configured to provide the touch driving signals to the first conducting layers through the data lines within horizontal blanking periods each between two consecutive horizontal refresh periods and/or within vertical blanking periods each between two consecutive frame periods.

9. The touch display of claim 8 wherein the data lines comprise N groups of data lines arranged in sequence from a first side of the touch display to a second side of the touch display opposite to the first side, the data driver is configured to provide the touch driving signals to the first conducting layers electrically coupled to the N groups of data lines in respective N time periods, and N is a positive integer greater than 1.

10. The touch display of claim 9 wherein data lines in each of the N groups of data lines are not separated by any other data lines and are configured to receive touch driving signals simultaneously in a same time period.

11. The touch display of claim 7 wherein the data lines comprise N groups of data lines arranged in sequence from a first side of the touch display to a second side of the touch display opposite to the first side, the N groups of data lines are configured to provide the touch driving signals in respective N time periods, and N is a positive integer greater than 1.

12. The touch display of claim 11 wherein data lines in each of the N groups of data lines are not separated by any other data lines and are configured to receive touch driving signals simultaneously in a same time period.

* * * * *